US010543772B1

(12) United States Patent
Muri

(10) Patent No.: US 10,543,772 B1
(45) Date of Patent: Jan. 28, 2020

(54) STRAP SECURING DEVICE

(71) Applicant: Roger Muri, Spring Valley, CA (US)

(72) Inventor: Roger Muri, San Diego, CA (US)

( * ) Notice: Subject to any disclaimer, the term of this patent is extended or adjusted under 35 U.S.C. 154(b) by 0 days.

(21) Appl. No.: 16/029,528

(22) Filed: Jul. 6, 2018

(51) Int. Cl.
| F16B 2/18 | (2006.01) |
| B60P 7/08 | (2006.01) |
| F16B 1/00 | (2006.01) |
| F16B 2/00 | (2006.01) |

(52) U.S. Cl.
CPC .............. B60P 7/0807 (2013.01); F16B 1/00 (2013.01); F16B 2/005 (2013.01); F16B 2/185 (2013.01); *F16B 2001/0035* (2013.01)

(58) Field of Classification Search
CPC .......... B60P 7/0807; F16B 1/00; F16B 2/005; F16B 2/185; F16B 2001/0035; F16B 2/10; F16B 2/12; F16B 2/06; F16B 2/14; Y10T 24/23; Y10T 24/32; Y10T 24/44051; Y10T 24/4406; Y10T 24/44043; Y10T 24/44034; Y10T 24/44615; Y10T 24/44624; Y10T 24/3969; Y10T 24/3996; Y10T 24/3973; E04H 15/64
See application file for complete search history.

(56) References Cited

U.S. PATENT DOCUMENTS

| 5,800,106 | A | 9/1998 | Miller |
| 6,789,295 | B1 * | 9/2004 | Svensson ............... E04H 15/64 24/115 M |
| 2006/0177282 | A1 | 8/2006 | Blosser |
| 2017/0370522 | A1 * | 12/2017 | Schield ................. F16M 13/04 |

* cited by examiner

*Primary Examiner* — Jack W Lavinder
(74) *Attorney, Agent, or Firm* — TJSL Patent Clinic

(57) ABSTRACT

A strap securing device and method for securing a free end of a strap to a metallic surface including an upper jaw, a lower jaw, and a leverage arm is disclosed. One of either the lower jaw or the upper jaw has a jagged contour and a magnetic surface. The upper jaw and the lower jaw are secured together through the leverage arm, which pinches the free end of a strap between the upper and lower jaws. The magnetic surface allows for attachment of the strap securing device to a metallic surface, such as the surface of a truck bed.

14 Claims, 5 Drawing Sheets

STRAP SECURING DEVICE

FIELD OF THE DISCLOSURE

This application relates to cargo strap technology and, more specifically, to securing the free end of a cargo strap to a metallic surface.

BACKGROUND

Cargo straps are widely used to transport a variety of cargo and are used to hold down various sizes of loads while driving. Cargo straps range from a very basic strip with hooks on either end to ratchet straps that the user can crank to achieve desired tension. Typically when the cargo strap is tightened to fit the load, the free end of the cargo strap hangs loose and the user may either manually tie it to something or let it flap in the wind while driving. If the free end of the cargo strap is not tied down, the user may accidentally run over it or drag it behind the vehicle or trailer. Even with multiple types of cargo straps available, many times the user must manually tie down the free end of the strap to secure it.

As cargo straps continue to develop, there is a need for a device that a user can attach to the free end of any cargo strap to secure it to the vehicle without having to tie it into place manually.

SUMMARY

Described here are a device and method for securing the free end of a cargo strap to a metallic surface. The strap securing device includes a lower jaw, an upper jaw, and a leverage arm. The leverage arm couples to both the upper and lower jaws to force the jaws together to pinch the strap between the jaws. At least one of the upper and lower jaws contains a jagged contour, which allows for entanglement with the strap. At least one of the upper and lower jaws also has a magnetic surface to allow the strap securing device to attach to a metallic surface.

In certain embodiments, at least one of the upper and lower jaws contains two opposing arms sized to allow for insertion into the leverage arm. In these embodiments, each opposing arm has at least one prong. And the leverage arm contains at least two slots positioned to allow at least one prong of each opposing arm to secure inside each slot. When the prongs are secured into the slots, the upper and lower jaws are secured together, thereby pinching the free end of a strap between them.

In certain embodiments, the jagged contour comprises multiple diamond shaped protrusions, which allow for entanglement with the strap to secure the free end of the strap to the strap securing device.

For some embodiments, the strap securing device is secured to a metallic surface by placing the free end of a strap on a surface with a jagged contour between a lower jaw and an upper jaw. The lower jaw is secured to the upper jaw when two opposing arms on either the lower or upper jaws are inserted into a leverage arm. The lower jaw is locked to the upper jaw when at least one prong on each of the two opposing arms is inserted into a slot on the leverage arm. The free end of the strap is secured to a metallic surface by placing the magnetic surface on at least one of the lower or upper jaws onto the metallic surface.

BRIEF DESCRIPTION OF THE FIGURES

The novel features of this invention, as well as the invention itself, both as to its structure and its operation, will be best understood from the accompanying drawings, taken in conjunction with the accompanying description.

DETAILED DESCRIPTION

In various embodiments, a strap securing device includes a lower jaw and an upper jaw that attach to each other via a leverage arm to secure a tail end of a strap and attach the tail end of the strap to a metallic surface. The lower jaw contains a jagged contour that allows the fibers of the strap to entangle with the strap securing device in order to grip the strap. The strap is pinched between the lower jaw and the upper jaw and secured to the strap securing device. The strap securing device contains a magnetic surface that allows the strap securing device to secure the tail end of the strap to a metallic surface.

Figure 1:
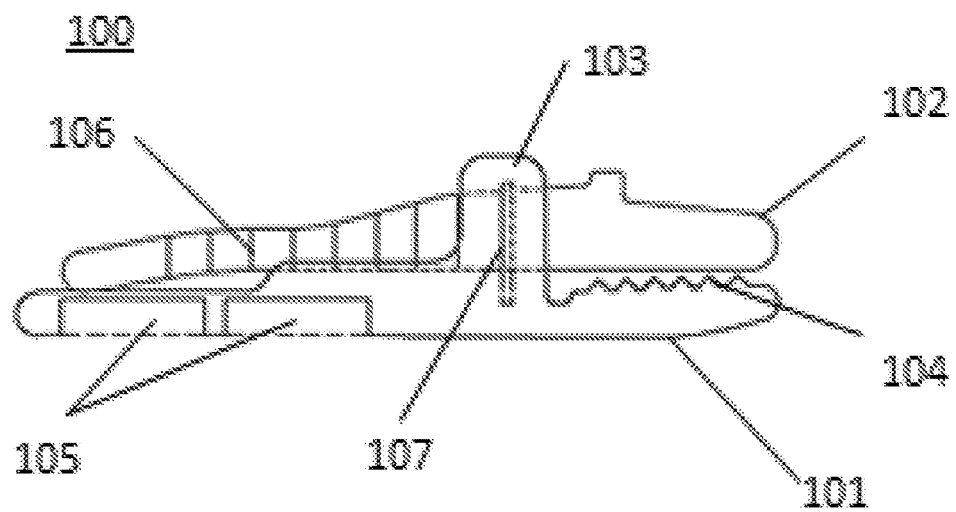
FIG. 1 illustrates a side view of an embodiment of a strap securing device where a lower jaw and an upper jaw are pinched together by a leverage arm.

FIG. 1 shows a side view of an embodiment of a strap securing device 100 where a lower jaw 101 and an upper jaw 102 are pinched together by a leverage arm 103. In some embodiments the upper jaw 102 fits inside the leverage arm 103, which secures the upper jaw 102 to the lower jaw 101. A magnetic surface 105 located on either the lower jaw 101 or the upper jaw 102 and allows the strap securing device 100 to attach to a metallic surface.

In some embodiments, the strap securing device 100 contains a jagged contour 104 that allows the strap securing device 100 to entangle with the fibers of a strap. In some embodiments, the upper jaw 102 contains multiple prongs 106 which are inserted into a slot 107 on the leverage arm 103 when the upper jaw 102 is inserted into the leverage arm 103 to lock the lower jaw 101 to the upper jaw 102.

Figure 2:
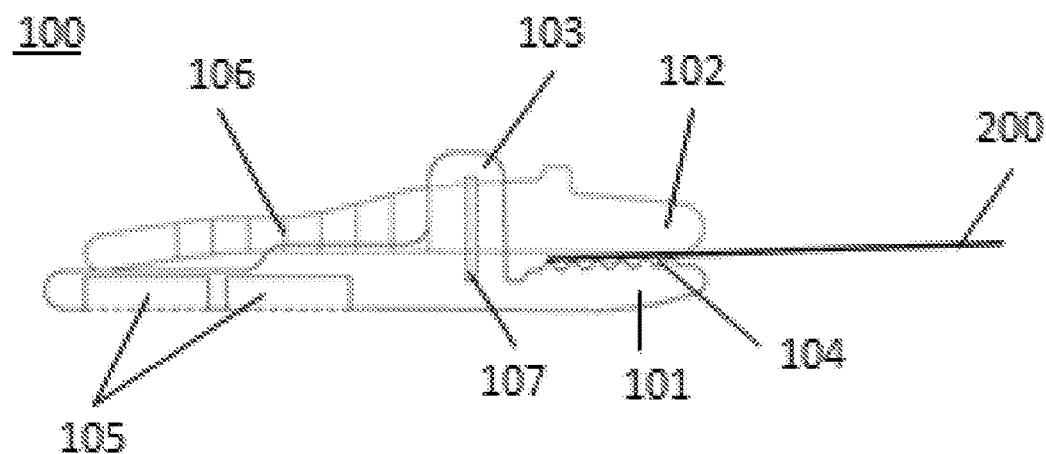
FIG. 2 illustrates a side view of an embodiment of a strap securing device with an inserted strap.

FIG. 2 shows a side view of an embodiment of a strap securing device 100 with an inserted strap 200. The free end of the strap 200 is secured to the strap securing device 100 between the upper jaw 102 and the lower jaw 101 when the upper jaw 102 is secured to the lower jaw 101 via the leverage arm 103. In some embodiments, the free end of the strap 200 is inserted into the strap securing device 100 when the upper jaw 102 is not secured into place. Once the strap 200 is inserted into the strap securing device 100, the upper jaw 102 is secured into place when at least one of the prongs 106 is inserted into the slot 107 located on the sides of the leverage arm 103. The leverage arm then forces the lower jaw 101 against the upper jaw 102, thereby pinching the strap 200 and securing it to the strap securing device 100. In some embodiments, a surface with a jagged contour 104 allows the strap securing device 100 to grip onto the free end of the strap 200 when the jagged contour 104 is engaged with the fibers of the strap 200. The strap securing device contains a magnetic surface 105 on either the upper jaw 102 or the lower jaw 101 to connect the strap 200 to a metallic surface such as a truck bed.

Figure 3:
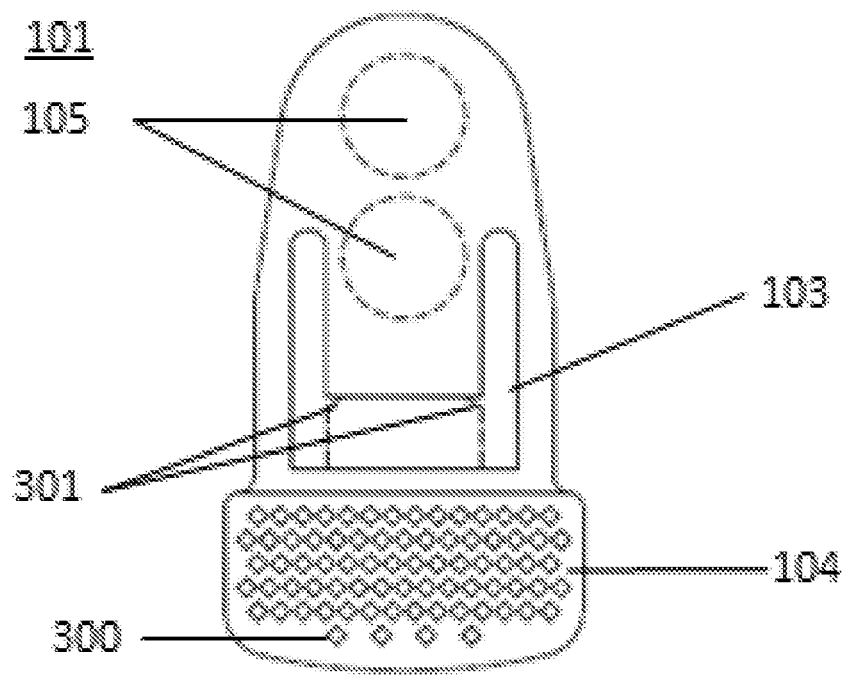
FIG. 3 illustrates a top view of an embodiment of a lower jaw and a leverage arm.

FIG. 3 shows a top view of an embodiment of a lower jaw 101 with a leverage arm 103. In some embodiments, the lower jaw 101 contains a magnetic surface 105 that allows the user to attach the strap securing device 100 to a metallic surface such as a truck bed.

The leverage arm 103 has a U-shape in the top view to allow for connection to the lower jaw 101 and better secure two opposing arms to the lower jaw 101. The dotted lines on the leverage arm 103 represent a bar that is located on the back of the lower jaw 101 that allows for the insertion of the two opposing arms. The slanted surface 301, allows for the prongs of the two opposing arms to be inserted into the leverage arm 103 due to the slanted shape of the prongs 106 corresponding with the slanted shape of the slanted surface allowing the prongs 106 to slide against the slanted surface 301. The slanted surface ensures that the two opposing arms do not slip out of the leverage arm 103 because the horizontal top of the slanted surface 301 will make contact with the horizontal side of the prongs preventing them from slipping past the slanted surface 301.

In some embodiments, the magnetic surface 105 contains two or more magnets, as shown in FIG. 3. Having multiple smaller magnets allows the use of a standard size magnet such as circular magnets shown in FIG. 3, which are modular off the shelf components, to increase the strength of the magnetic connection. The magnets in FIG. 3 are indicated in dotted lines because in some embodiments the magnetic surface 105 appears on the bottom side of the lower jaw 101 and FIG. 3 is an exemplary embodiment of a top view of a lower jaw 101.

In some embodiments, the lower jaw 101 contains a surface with a jagged contour 104 to allow the strap securing device 100 to grip a strap 200 and secure it into place. The jagged contour 104 entangles with the fibers of the strap 200 to secure it to the strap securing device 100. In some embodiments, the jagged contour 104 contains multiple diamond shaped protrusions 300 configured to entangle with the fibers of the strap 200. The diamond shaped protrusions 300 increase the rigidity of the jagged contour and increases the friction between the lower jaw 101 and the strap 200.

In some embodiments, the leverage arm 103 forces the lower jaw 101 against the upper jaw 102 by confining a portion of the upper jaw 102 to the leverage arm 103. When the lower jaw 101 is forced against the upper jaw 102, the jaws pinch the strap 200 to secure it to the strap securing device 100.

Figure 4:
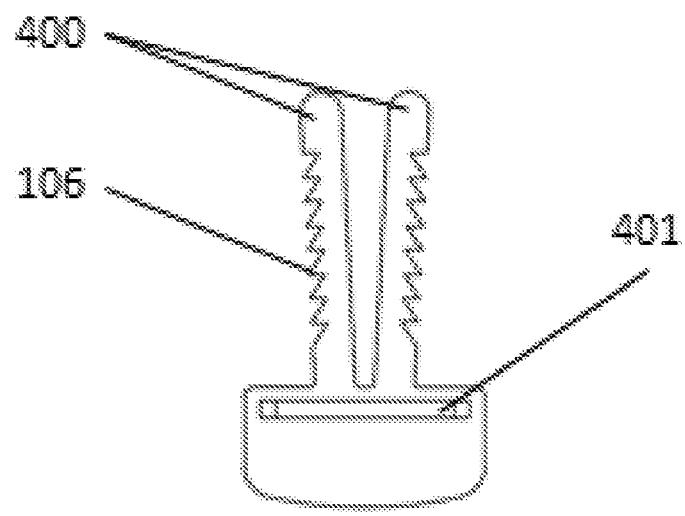
FIG. 4 illustrates a front view of an upper jaw comprising two opposing arms, each comprising one or more prongs.

FIG. 4 shows a front view of an upper jaw 102 comprising two opposing arms 400, each comprising one or more prongs 106. The upper jaw 102 is constructed to fit into the leverage arm 103 to pinch a strap 200 between the upper and lower jaws to secure it to the strap securing device 100. The two opposing arms 400 are configured in a V shape with the open top of the V at the tip of the upper jaw 102. The two opposing arms 400 are inserted into the leverage arm 103 by pinching the two opposing arms 400 towards each other, sliding them through the leverage arm 103 and releasing the two opposing arms 400. When the two opposing arms 400 are released, the upper jaw 102 is secured to the lower jaw 101 by use of the prongs 106.

A prong 106 includes a serration pattern with angled and horizontal portions that makes the opposing arms 400 of the upper jaw 102 easier to insert into the leverage arm 103. Due to the angled top, the prongs stop the two opposing arms from falling out of the leverage arm unintentionally due to the horizontal surface hitting against the horizontal surface of the slanted surface 301. When the two opposing arms 400 are inserted into the leverage arm 103, one of the prongs 106 on each opposing arms are inserted into a slot 107 on the leverage arm 103. The two opposing arms 400 are released from the leverage arm 103 by pinching the two opposing arms 400 towards each other and sliding them through the leverage arm 103.

In some embodiments, the upper jaw 102 contains a stopper 401 that is raised above the surface of the upper jaw 102. The stopper 401 makes contact with the leverage arm 103 when the user slides the two opposing arms 400 through the leverage arm 103. The stopper 401 prevents the user form pulling the upper jaw too far through the leverage arm and ensures that the jaws are optimally placed to secure the strap 200.

Figure 5:
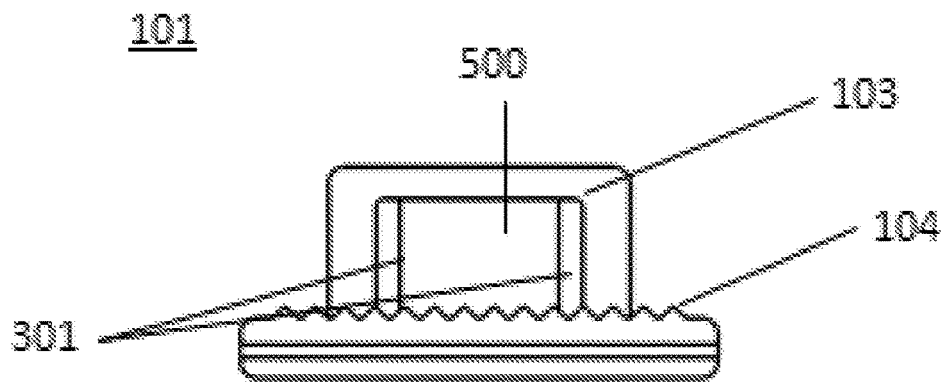
FIG. 5 illustrates front view of a lower jaw and a leverage arm of a strap securing device.

FIG. 5 shows a front view of an embodiment of a lower jaw 101 and a leverage arm 103 of a strap securing device 100. In some embodiments, the leverage arm 103 has an opening 500 sized to allow for insertion of the two opposing arms 400 of the upper jaw 102. In some embodiments, the lower jaw 101 contains a jagged contour 104, which allows the strap securing device 100 to grip to the fibers of the strap 200. The two lines under the jagged contour 104 represent the curvature of the surface of the bottom edge to the lower jaw 101. The surface is curved to remove any corners that might scratch a user or an object. The slanted surface 301 allows for the prongs 106 of the two opposing arms 400 to be inserted into the leverage arm 103 but prevents them from sliding out of the leverage arm 103.

Figure 6:
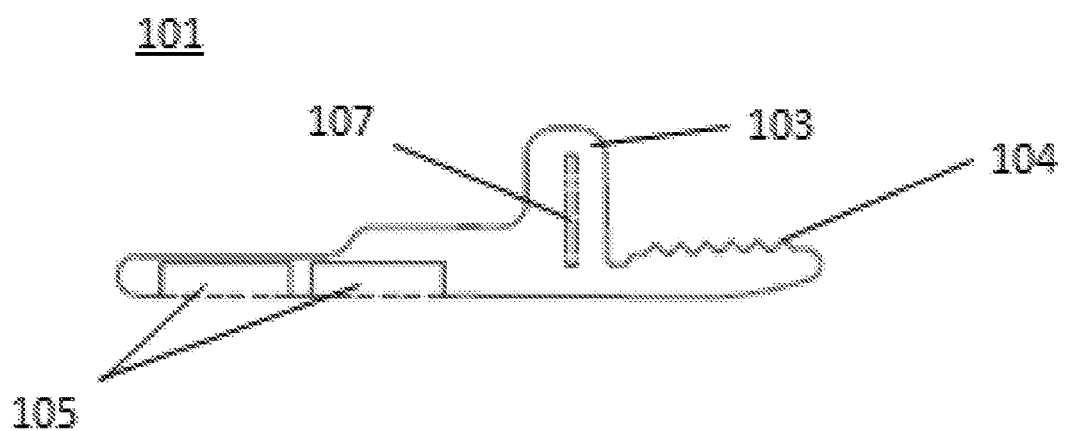
FIG. 6 illustrates a side view of an embodiment of a lower jaw and a leverage arm.

FIG. 6 shows a side view of an embodiment of a lower jaw 101 and a leverage arm 103 of a strap securing device 100. The slot 107 is the opening in the leverage arm within which the prongs 106 of the upper jaw 102 enter in order to lock the lower jaw 101 to the upper jaw 102. Without the slot 107, the upper jaw 102 may not lock into position on the lower jaw 101 and the upper jaw 102 could slide out of the leverage arm 103 which would release the strap 200 from the strap securing device 100. As shown in FIG. 6, in some embodiments, the magnetic surface 105 is embedded within the lower jaw and is flush with the surface of the lower jaw. In other embodiments, the magnetic surface 105 is in an extra layer that protrudes away from the surface of the lower jaw.

Figure 7:
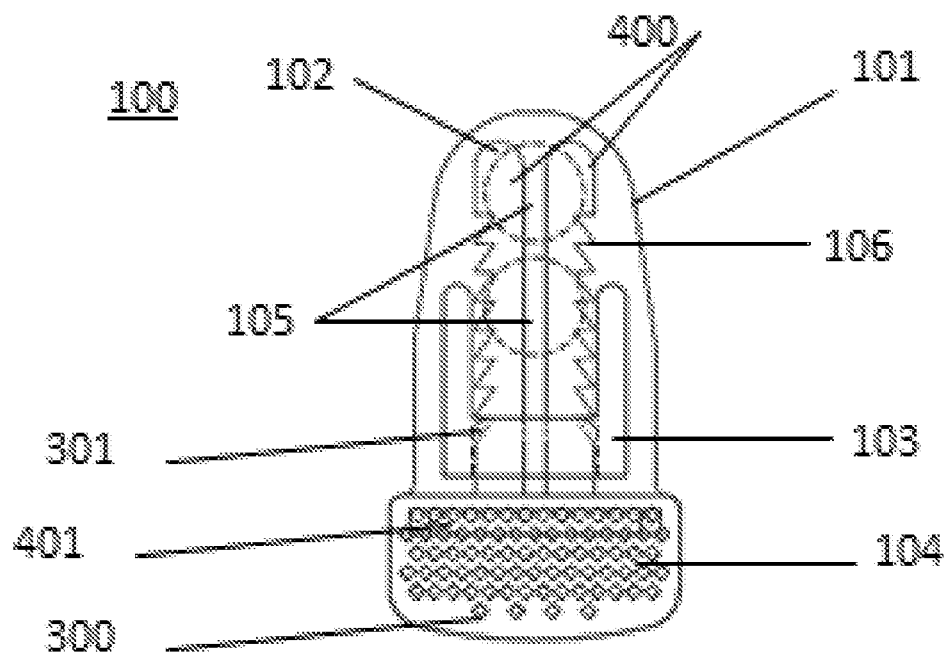
FIG. 7 illustrates a top view of an embodiment of a strap securing device comprising a lower jaw, an upper jaw, and a leverage arm.

FIG. 7 shows a top view of an embodiment of a strap securing device 100 comprising a lower jaw 101, an upper jaw 102, and a leverage arm 103. In some embodiments, the lower jaw 101 and the upper jaw 102 are pinched together by the leverage arm 103 to secure the upper jaw 101 to the lower jaw 102. The strap securing device 100 includes at least one magnetic surface 105 that allows the user to attach the strap securing device 100 to a metallic surface such as a truck bed. The strap securing device 100 also includes at least one surface with a jagged contour 104 to allow the strap securing device 100 to grip onto a strap 200 to secure it into place. In some embodiments, the jagged contour might appear on the upper jaw 102 in place of or in addition to the lower jaw 101 in order to enforce the grip of the strap securing device 100 to the strap 200. In some embodiments, the jagged contour 104 includes diamond shaped protrusions 300 as shown in FIG. 7.

When the strap securing device 100 is in the closed position, the two opposing arms 400 are pinched together and slid into the leverage arm 103. In some embodiments, in the closed position, the horizontal surface of the prongs 106 hits against the horizontal surface of the slanted surface 301 that holds the upper jaw 102 into place in the leverage arm 103 because it does not allow the two opposing arms 400 to be removed from the upper jaw 102 unless the user pinches the two opposing arms 400 together. The stopper 401 ensures that the upper jaw 102 is in the correct placement because when it the stopper 401 makes contact with the leverage arm 103, the upper jaw 102 is in the locked position on the leverage arm 103 and connected to the lower jaw 101.

In some embodiments, the magnetic surface 105 can appear on the upper jaw 102 instead of the lower jaw 101. In those other embodiments, the magnetic surface 105 can be embedded within the upper jaw 102 or attached to the upper jaw 102 in an additional layer on top of the upper jaw 102.

In some embodiments, the lower jaw 101 and the upper jaw 102 are unlocked when the two opposing arms 400 are pinched together until the prong 106 on each of the two opposing arms 400 is removed from the slot 107 of the leverage arm 103. In some embodiments, the strap 200 is released when the lower jaw 101 and the upper jaw 102 are unlocked and the two opposing arms 400 are removed from the leverage arm 103 and slid through the opening 500.

Figure 8:
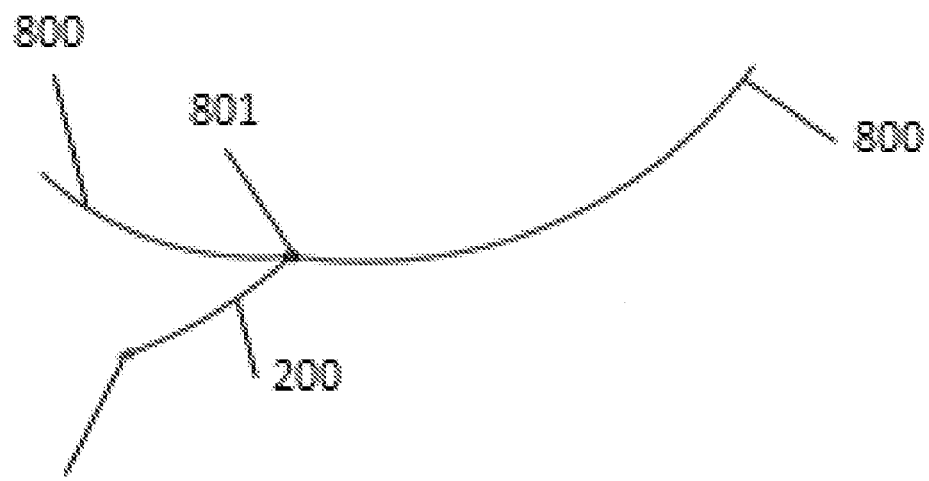
FIG. 8 illustrates an embodiment of a strap securing device used on a strap.

FIG. 8 shows an embodiment of a strap securing device 100 used on a strap 200. In some embodiments, the strap 200 is secured to a metallic surface at each of two ends 800 and tightened by a tension device 801. The strap securing device 100 attaches to the free end of a strap 200 to secure the free end of a cargo strap 200 to a metallic surface.

Figure 9:
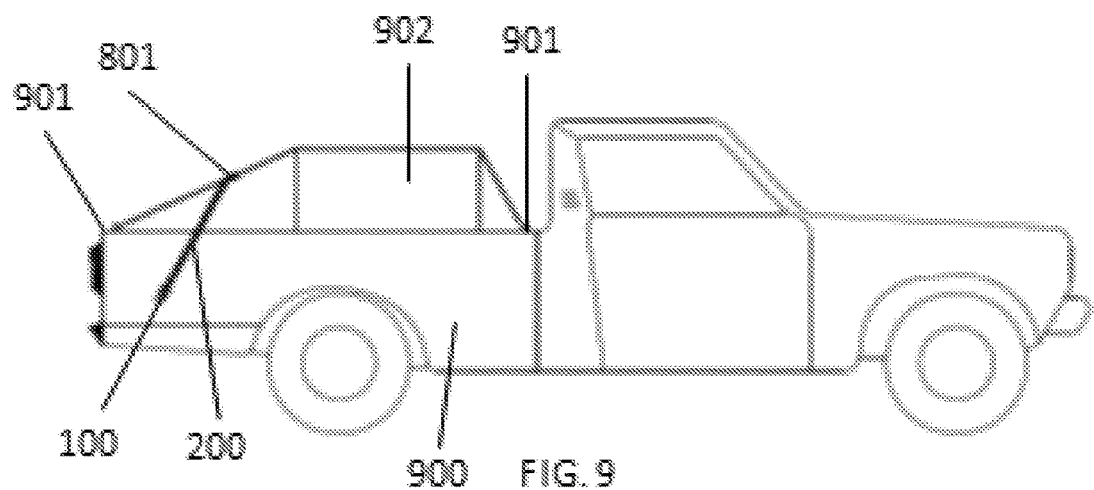
FIG. 9 illustrates an embodiment of a strap securing device where the strap securing device is secured to a metallic surface (e.g., a metallic structure of a vehicle).

FIG. 9 shows an embodiment of a strap securing device 100 where the strap securing device 100 is secured to a metallic surface 900 (e.g., a metallic structure of a vehicle). In some embodiments, the strap securing device 100 is used to secure the free end of a cargo strap 200 to a metallic surface 900 when the strap 200 is used to secure a load 902 in a vehicle. In FIG. 9, a strap 200 is secured on each side of the load 902 by two securing devices such as tie downs 901. The free end of the strap 200 is secured to the metallic surface 900 via the strap securing device 100.

Spatially relative terms, such as "bottom," "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

While the invention has been described here in terms one or more preferred embodiments, it will be apparent to those skilled in the art that various changes and modifications can be made to those embodiments, and other embodiments altogether can be used to carry out the invention, without departing from the scope and spirit of the invention.

The invention claimed is:

1. A strap securing device comprising:
 a lower jaw;
 an upper jaw; and
 a leverage arm coupled to both the upper jaw and the lower jaw, wherein the leverage arm forces the upper jaw against the lower jaw and pinches a strap between the upper jaw and the lower jaw;
 wherein at least one of the lower jaw and the upper jaw comprises a jagged contour configured for entanglement with the strap,
 wherein at least one of the lower jaw and the upper jaw further comprises a magnetic surface configured for attachment to a metallic surface, and
 wherein the upper jaw further comprises two opposing arms sized to allow for insertion into the leverage arm.

2. The device of claim 1, wherein the two opposing arms are pinched together to allow for removal from the leverage arm.

3. The device of claim 1, wherein the upper jaw further comprises a stopper protruding from the metallic surface of the upper jaw and configured to contact the leverage arm when the two opposing arms are placed into the leverage arm.

4. The device of claim 1, wherein each opposing arm comprises at least one prong, each prong having a serration pattern with an angled portion and a horizontal portion.

5. The device of claim 4, wherein the leverage arm comprises at least one slot positioned on the leverage arm to allow the at least one prong of each opposing arm to secure inside the slot, securing the strap between the upper jaw and the lower jaw.

6. The device of claim 1, wherein the jagged contour comprises diamond shaped protrusions configured to entangle with fibers of the strap.

7. The device of claim 1, wherein the leverage arm further comprises a slanted surface having a slanted top and horizontal bottom, wherein the slanted surface is configured to allow prongs to pass into the leverage arm by sliding against the slanted top but prohibits the prongs from falling out of the leverage arm when a horizontal surface of the prongs contacts the horizontal bottom of the slanted surface.

8. The device of claim 1, wherein the magnetic surface is embedded into one of the upper jaw and the lower jaw.

9. The device of claim 1, wherein the magnetic surface is connected to one of the upper jaw and the lower jaw.

10. The device of claim 1, wherein the magnetic surface comprises more than one magnet.

11. The device of claim 1, wherein the magnetic surface is embedded into one of the upper jaw and the lower jaw.

12. The device of claim 1, wherein the magnetic surface protrudes from a surface of one of the upper jaw and the lower jaw.

13. The device of claim 1, wherein a bottom edge of the lower jaw is curved.

14. A strap securing device comprising:
 a lower jaw comprising:
  a leverage arm comprising a slot;
  a jagged contour comprising a plurality of diamond shaped protrusions; and
  a magnetic surface; and
 an upper jaw comprising two opposing arms, each opposing arm comprising a plurality of prongs;
 wherein a strap is configured to entangle with the diamond shaped protrusions on the jagged contour,
 wherein the leverage arm, sized for inserting the two opposing arms on the upper jaw, forces the upper jaw against the lower jaw and pinches the strap between the upper jaw and the lower jaw, wherein the prongs on each opposing arm on the upper jaw are sized for insertion into the slot of the leverage arm, and wherein the magnetic surface on the lower jaw is configured to attach to a metallic surface.

* * * * *